United States Patent Office 3,289,202
Patented Nov. 29, 1966

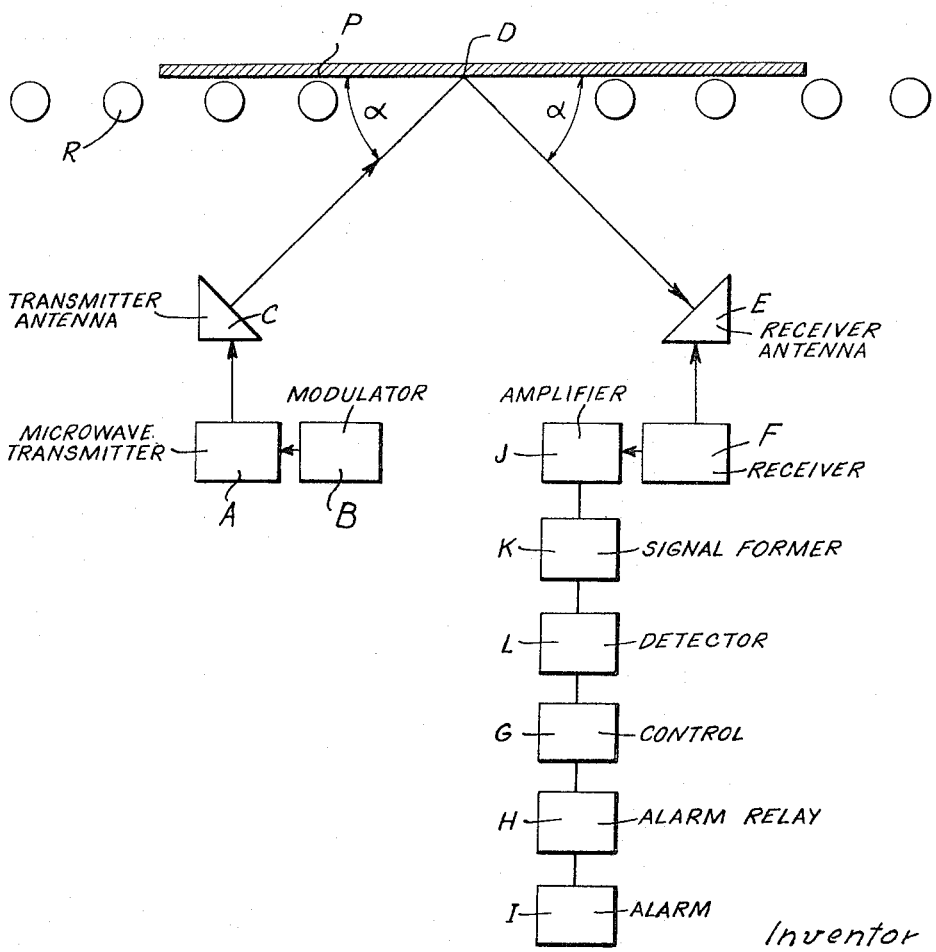

3,289,202
APPARATUS FOR DETECTING THE PRESENCE OF OBJECTS BY ELECTROMAGNETIC RADIATION
Jean-Claude Preti, Clamart, France, assignor to Societe de Fabrication d'Instruments de Mesure (S.F.I.M.), Seine-et-Oise, France
Filed Oct. 12, 1964, Ser. No. 403,261
Claims priority, application France, Mar. 4, 1964, 966,019, Patent 1,395,838
3 Claims. (Cl. 343—5)

The detection of objects by means of radiation, especially by the use of infra-red rays, has already been envisaged.

In certain cases, however, the detection function can be upset by the presence of parasite light sources. Moreover, in known arrangements resorted to heretofore, a signal is delivered even when the object to be detected occupies a non-determinate position, and the presence of other remotely located objects can interfere with correct operation of the system.

It is an object of the present invention to overcome these drawbacks.

The invention is more particularly though not exclusively applicable to the detection of such metal objects as metal plates and sheeting, elevators, overhead travelling crane cabs and the like, and utilizes microwaves to constitute the electromagnetic detection radiation.

In accordance with the present invention a microwave transmitter is directed at an inclined angle toward the location whereat detection is to be effected. Objects present at that location will then behave in the manner of a mirror, and said transmitter is accordingly associated to a microwave receiver placed in the path of the beam reflected by the object.

Such an arrangement eliminates the undesirable effects of any parasite sources or other objects outside the reflection plane which could otherwise interfere with transmission between the transmitter and the receiver.

In a form of application specific to the detection of metal plates or sheeting on a conveyor, most notably in a rolling mill, the transmitter and the receiver may be directed at the same point on a reflection plane and be disposed beneath a roller-type conveyor, for instance, whereby to detect the presence or otherwise of the plates or sheeting being conveyed, without being affected by the conveyor rollers or by such external objects transiting through the space ahead of or past the reflection point as casting ladles, overhead travelling cranes, or the like. Moreover, the temperature of the metal plates or sheeting has no adverse effect on operation of the system.

The description which follows with reference to the accompanying non-limitative exemplary drawing will give a clear understanding of how the invention can be carried into practice.

The single figure in the drawing shows in highly diagrammatic fashion a detection apparatus according to the present invention.

Referring to the accompanying drawing, the detection apparatus shown thereon comprises a microwave transmitter A including an oscillator for generating a high-frequency carrier which is frequency-modulated by an alternating current source B and delivers a signal which is radiated by a directional antenna C toward a point D on a surface of a metal plate P, the antenna boresight forming an angle α of incidence with the flat bottom surface of the plate. The plate P is guided on a conveyor of which only a few rollers R are seen in the drawing.

A portion of said beam is reflected by the plate P, at an angle equal to the angle of incidence, toward a directional receiving antenna E associated with a receiver F which may be of the demodulating crystal type, say, and from across whose terminals the modulating wave may be recovered.

The use of this modulation permits of obtaining periodic signals at the input end of an amplifier J positioned after the detector that are more readily exploitable than direct-current voltages.

These signals are amplified, formed by, say, a Schmitt trigger K, detected in a detector L, and finally applied to a stage G controlling closure of an alarm relay H whose function is to render any convenient warning device I operative or inoperative.

Thus, when a length of sheet metal is located at the incidence point D to which the two antennae converge, an electromagnetic radiation link is established between the transmitter and the receiver, whereby said alarm relay is caused to operate and possibly hold in, thereby triggering the device I.

It will be clearly apparent that any object located outside the conveyor plane and hence not having a flat face at the point D will be incapable of establishing the required link.

In the specific application of the invention involving detection of the presence of metal plates or sheeting P on a conveyor R, any object of a different nature or any object located outside the path of the plate P will fail to establish said link. Light sources or objects emitting infra-red radiation cannot interfere with operation of such a system.

It goes without saying that many modifications may be made to the specific form of embodiment hereinbefore described without departing from the spirit and scope of the invention as claimed in the appended claims.

What I claim is:
1. A detecting apparatus comprising, in combination:
   (a) conveying means for guiding an object having a flat face in a predetermined path parallel to said face;
   (b) a microwave transmitter;
   (c) first directional antenna means operatively connected to said transmitter and directed toward said path for directing an incident beam of electromagnetic radiation toward a predetermined portion of said path in a direction obliquely inclined relative to the face of an object guided in said portion of the path by said conveying means, whereby said beam is reflected from said face in another direction obliquely inclined relative to said face;
   (d) a microwave receiver;
   (e) second directional antenna means operatively connected to said receiver and directed toward said portion of said path for receiving said reflected beam; and
   (f) signal generating means connected to said receiver for generating a perceptible signal in response to the reception of the reflected beam by said second antenna means.
2. An apparatus as set forth in claim 1, wherein said transmitter includes oscillator means for generating a high-frequency carrier and modulator means operatively connected to said oscillator means for modulating said carrier with a modulating wave, said incident beam essentially consisting of the modulated carrier.
3. An apparatus as set forth in claim 2, wherein said receiver includes detector means for demodulating said carrier and for thereby recovering the modulating wave, said signal generating means responding to the modulating wave.

References Cited by the Examiner

UNITED STATES PATENTS

| | | | |
|---|---|---|---|
| 2,297,534 | 9/1942 | Brulin | 343—15 X |
| 2,316,751 | 4/1943 | Adler | 343—15 X |
| 3,045,233 | 7/1962 | Katz et al. | 343—17.5 X |
| 3,163,861 | 12/1964 | Suter | 343—5 X |
| 3,220,005 | 11/1965 | Benoit | 343—5 |

CHESTER L. JUSTUS, *Primary Examiner.*

P. M. HINDERSTEIN, R. D. BENNETT,
*Assistant Examiners.*